United States Patent
Yu

(10) Patent No.: US 9,301,162 B2
(45) Date of Patent: Mar. 29, 2016

(54) METHOD, BASE STATION AND SYSTEM FOR MANAGING RESOURCES

(71) Applicant: Huawei Technologies Co., Ltd., Shenzhen (CN)

(72) Inventor: Qingxiang Yu, Shenzhen (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 254 days.

(21) Appl. No.: 13/936,554

(22) Filed: Jul. 8, 2013

(65) Prior Publication Data

US 2013/0294344 A1 Nov. 7, 2013

Related U.S. Application Data

(63) Continuation of application No. PCT/CN2011/085096, filed on Dec. 31, 2011.

(30) Foreign Application Priority Data

Jan. 6, 2011 (CN) .......................... 2011 1 0006620

(51) Int. Cl.
*H04W 24/02* (2009.01)
*H04L 1/00* (2006.01)
(Continued)

(52) U.S. Cl.
CPC .............. *H04W 24/02* (2013.01); *H04L 1/0026* (2013.01); *H04L 1/0045* (2013.01); *H04L 1/0061* (2013.01); *H04L 1/0073* (2013.01); *H04L 1/1867* (2013.01); *H04W 72/0406* (2013.01)

(58) Field of Classification Search
CPC .............. H04W 24/02; H04W 72/0406; H04L 1/0045; H04L 1/0026; H04L 1/0073; H04L 1/0061; H04L 1/1867
See application file for complete search history.

(56) References Cited

U.S. PATENT DOCUMENTS

| 8,107,547 B2 * | 1/2012 | Muharemovic et al. ...... 375/260 |
| 2008/0253318 A1 | 10/2008 | Malladi et al. |

(Continued)

FOREIGN PATENT DOCUMENTS

| CN | 101242384 A | 8/2008 |
| CN | 101499876 A | 8/2009 |

(Continued)

OTHER PUBLICATIONS

Fujitsu, "Summary of email discussion on PUCCH/PUSCH selection" Agenda 6.2.3, 3GPP TSG-RAN1#63. Jacksonville, USA, Nov. 15-19, 2010, 11 pages.

NEC Group, "CQI + ACK/NACK transmission in PUCCH" Agenda Item 6.2.4, 3GPP TSG RAN WG1 Meeting #51. Jeju, Korea, Nov. 5-9, 2007, 2 pages.

(Continued)

*Primary Examiner* — Jung Park
*Assistant Examiner* — Chuong M Nguyen
(74) *Attorney, Agent, or Firm* — Brinks Gilson & Lione

(57) ABSTRACT

A method, a base station and a system for managing resources belong to the field of communication technologies. In an embodiment of the present invention, the base station decodes the uplink data or the acknowledgement information sent by the user equipment according to the format of the periodic indication information comprised in the uplink data or the acknowledgement information, determines that the uplink data or the acknowledgement information sent by the user equipment comprises the periodic indication information when the decoding is successful, and then validates the periodic resources corresponding to the periodic indication information comprised in the uplink data or the acknowledgement information. The technical solution of the present invention overcomes the problem in the prior art that data is erroneously retransmitted since the base station and the user equipment asynchronously validate the periodic resources corresponding to the periodic indication information, thereby reducing interruption time delay.

14 Claims, 5 Drawing Sheets

(51) Int. Cl.
*H04L 1/18* (2006.01)
*H04W 72/04* (2009.01)

(56) References Cited

U.S. PATENT DOCUMENTS

| | | | |
|---|---|---|---|
| 2009/0168718 A1 | 7/2009 | Wang et al. | |
| 2009/0245284 A1 | 10/2009 | Xu et al. | |
| 2010/0039953 A1* | 2/2010 | Zhang | 370/252 |
| 2010/0128687 A1* | 5/2010 | Oteri et al. | 370/329 |
| 2011/0268032 A1* | 11/2011 | Kim et al. | 370/328 |
| 2012/0120817 A1* | 5/2012 | Khoshnevis et al. | 370/252 |

FOREIGN PATENT DOCUMENTS

| | | | |
|---|---|---|---|
| CN | 101547022 A | 9/2009 | |
| CN | 101909356 A | 12/2010 | |
| CN | 102036302 A | 4/2011 | |
| EP | 2214442 A1 | 8/2010 | |
| JP | 2010-524282 A | 7/2010 | |
| JP | 2011-509044 A | 3/2011 | |
| KR | 20080086315 A | 9/2008 | |
| KR | 20080088286 A | 10/2008 | |
| TW | 201004198 A | 1/2010 | |
| WO | WO 2008115837 A1 | 9/2008 | |
| WO | WO 2010/022075 A1 | 2/2010 | |

OTHER PUBLICATIONS

Office Action issued in corresponding Chinese Patent Application No. 201110006620.2, mailed Sep. 6, 2012, 17 pages.
Office Action issued in corresponding Chinese Patent Application No. 201110006620.2, mailed Mar. 13, 2013, 13 pages.
Office Action issued in corresponding Chinese Patent Application No. 201110006620.2, mailed Jun. 18, 2013, 12 pages.
Written Opinion of the International Searching Authority issued in corresponding PCT Patent Application No. PCT/CN2011/085096, mailed Apr. 5, 2012, 10 pages.
International Search Report issued in corresponding PCT Patent Application No. PCT/CN2011/085096, mailed Apr. 5, 2012, 2 pages.
LTE, "$3^{rd}$ Generation Partnership Project; Technical Specification Group Radio Access Network; Evolved Universal Terrestrial Radio Access (E-UTRA); Multiplexing and Channel Coding" (Release 9) 3GPP TS 36.212. V9.3.0, Sep. 2010, 61 pages.
Gu Xiaolie, "Research on MAC Protocol of WLAN" vol. 20, Supplement of Issue 5, Media access, 2007, printed from cnki.com.cn, 4 pages.
Research in Motion UK Limited, AT&T, "DRX and SPS Alignment in REL9" Agenda Item 6.7.2, 3GPP TSG-RAN2#66bis, Los Angeles, U.S.A., Jun. 29-Jul. 3, 2009, 4 pages.

* cited by examiner

FIG. 4 (1)

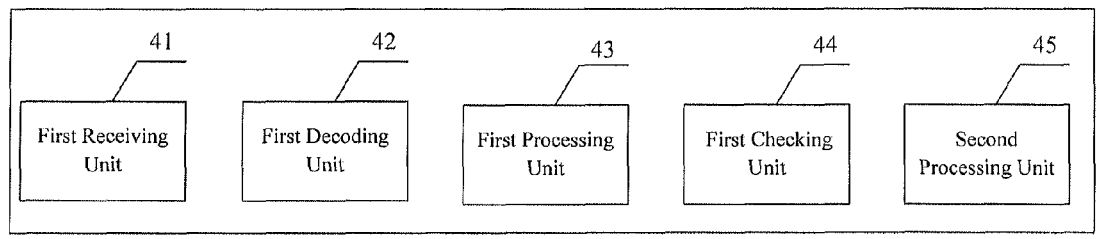
FIG. 4 (2)
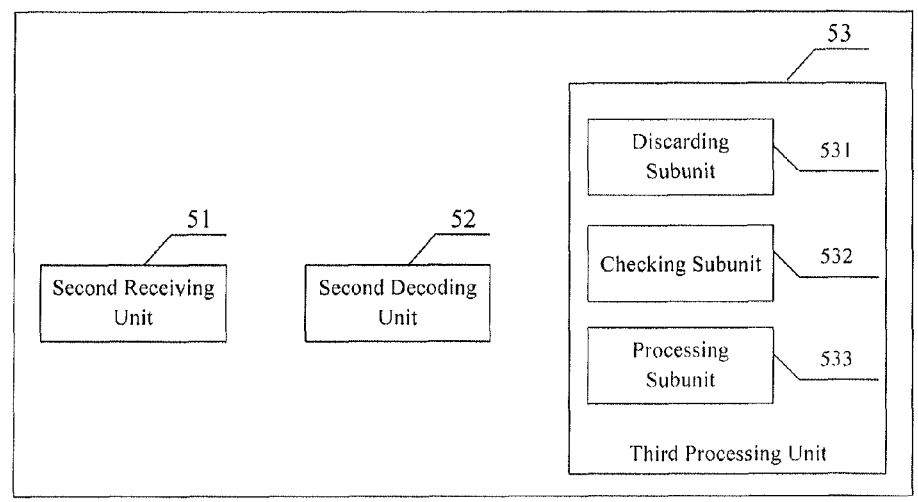
FIG. 5

US 9,301,162 B2

1

METHOD, BASE STATION AND SYSTEM FOR MANAGING RESOURCES

CROSS-REFERENCE TO RELATED APPLICATIONS

This application is a continuation of International Application No. PCT/CN2011/085096, filed on Dec. 31, 2011, which claims priority to Chinese Patent Application No. 201110006620.2, filed on Jan. 6, 2011, both of which are hereby incorporated by reference in their entireties.

TECHNICAL FIELD

This invention relates to the field of communication technologies, and particularly, to a method, a base station and a system for managing resources.

BACKGROUND

In the Long Term Evolution (LTE) system, after the user equipment receives a Radio Resource Control (RRC) command sent from the source base station, it randomly sends an access request to the target base station. The target base station receives the access request and returns an access response to establish a connection with the user equipment. After establishing a connection with the user equipment, the target base station timely validates the periodic resources corresponding to the periodic indication information (e.g., CQI (Channel Quality Indication), SRS (Sounding Reference Signal) and SRI (Scheduling Request Indication)) related to the system frame number, such as a subframe periodically transmitting the CQI or SRS, while the user equipment validates the periodic resources related to the System Frame Number (SFN) after acquiring the SFN.

For example, after establishing a connection with the user equipment, the target base station timely validates the subframe transmitting the CQI. Herein, the target base station considers that there will be the CQI reported by the user equipment in the subframe transmitting the CQI, and thus a Cyclic Redundancy Check (CRC) is performed. However, due to the user equipment and the target base station asynchronously validate the subframe transmitting the CQI, the user equipment may still not validate the subframe transmitting the CQI, thus an error is checked out by the CRC performed by the target base station, the data is erroneously retransmitted, and the interruption time delay is increased.

SUMMARY

The embodiment of the present invention provides a method, a base station and a system for managing resources, which prevent the data being erroneously retransmitted, thereby reducing the interruption time delay.

An aspect of the present invention provides a method for managing resources, comprising: receiving, by a base station, first uplink data or first acknowledgement information sent by a user equipment; decoding, by the base station, the first uplink data or the first acknowledgement information according to a format of periodic indication information comprised in the first uplink data or the first acknowledgement information; and when the first uplink data or the first acknowledgement information is successfully decoded, determining, by the base station, that the first uplink data or the first acknowledgement information comprises the periodic indication information, and validating, by the base station, periodic

2 resources corresponding to the periodic indication information comprised in the first uplink data or the first acknowledgement information.

Another aspect of the present invention provides a base station, comprising: a first receiving unit configured to receive first uplink data or first acknowledgement information sent by a user equipment; a first decoding unit configured to decode the first uplink data or the first acknowledgement information according to a format of periodic indication information comprised in the first uplink data or the first acknowledgement information; and a first processing unit configured to determine that the first uplink data or the first acknowledgement information comprises the periodic indication information when the first decoding unit successfully decodes the first uplink data or the first acknowledgement information, and to validate periodic resources corresponding to the periodic indication information comprised in the first uplink data or the first acknowledgement information received by the first receiving unit.

Still another aspect of the present invention provides a mobile communication system, comprising the aforementioned base station.

In the above technical solutions, the base station decodes the uplink data or the acknowledgement information sent by the user equipment according to the format of the periodic indication information comprised in the uplink data or the acknowledgement information, determines that the uplink data or the acknowledgement information sent by the user equipment comprises the periodic indication information when the decoding is successful, and then validates the periodic resources corresponding to the periodic indication information comprised in the uplink data or the acknowledgement information, which overcomes the problem in the prior art that data is erroneously retransmitted due to the base station and the user equipment asynchronously validating the periodic resources corresponding to the periodic indication information, thereby reducing the interruption time delay.

BRIEF DESCRIPTION OF DRAWINGS

In order to more clearly describe the technical solutions of the embodiments of the present invention, the drawings to be used in the descriptions of the embodiments are briefly introduced as follows. Obviously, the following drawings just illustrate some embodiments of the present invention, and a person skilled in the art can obtain other drawings from these drawings without paying any creative effort.

FIG. 4 (2) is a structural schematic diagram of another base station according to an embodiment of the present invention; and FIG. 5 is a structural schematic diagram of still another base station according to an embodiment of the present invention.

DESCRIPTION OF EMBODIMENTS

The technical solutions of the embodiments of the present invention will be clearly and completely described as follows with reference to the drawings in the embodiments of the present invention. Obviously, those described herein are just parts of the embodiments of the present invention rather than all the embodiments. Based on the embodiments of the present invention, all other embodiments obtained by a person skilled in the art without paying any creative effort shall fall within the protection scope of the present invention.

Figure 1:
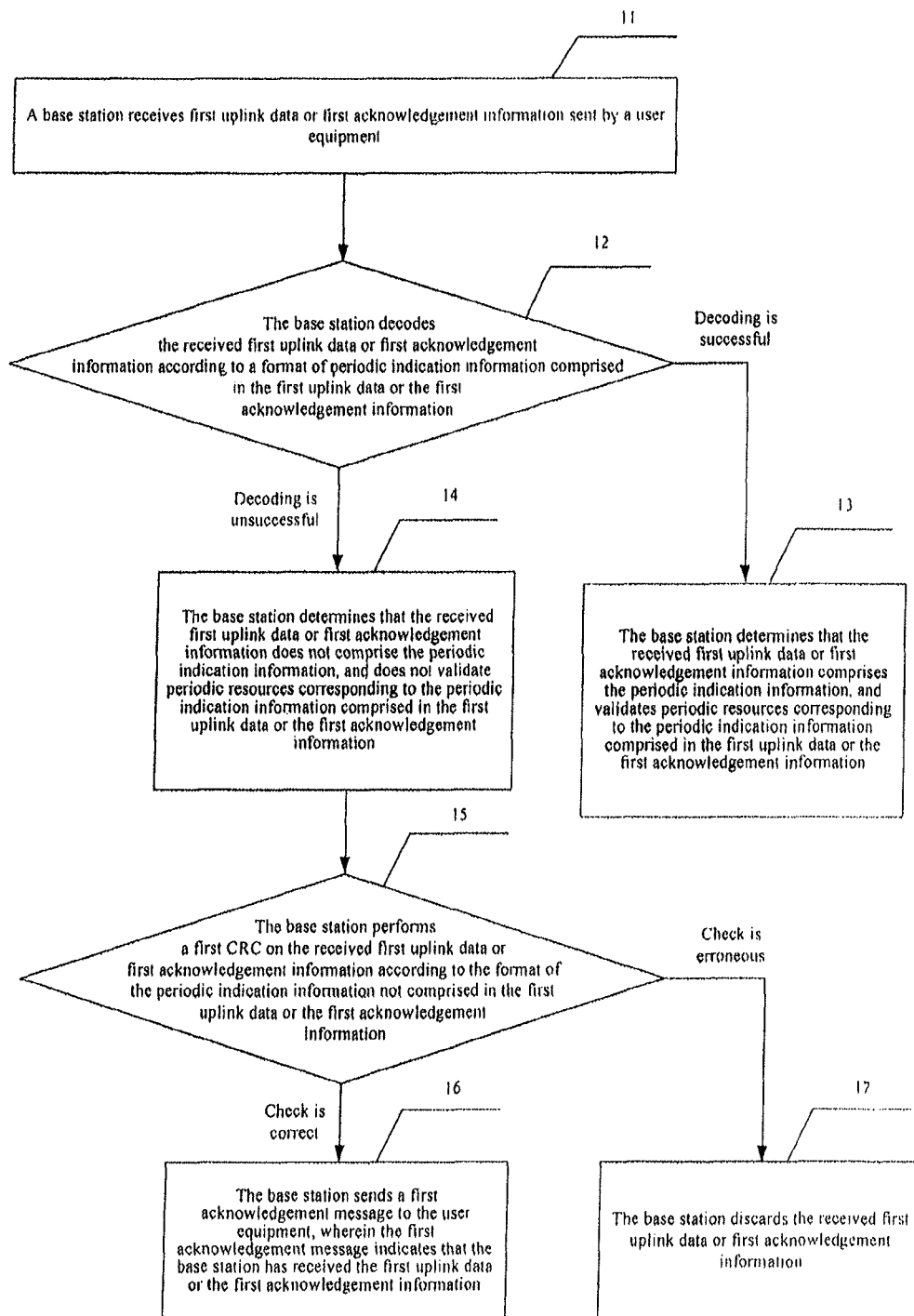
FIG. 1 is a flow diagram of a method for managing resources according to an embodiment of the present invention.

As illustrated in FIG. 1, the embodiment of the present invention provides a method for managing resources, including the following contents.

11: A base station receives first uplink data or first acknowledgement information sent by a user equipment. During the implementation process, the acknowledgement information may be an acknowledgement character ACK (acknowledge).

Optionally, before step 11, the method may further include:
10: after receiving an access request sent by the user equipment, the base station returns an access response to the user equipment to establish a connection with the user equipment.

12: The base station decodes the received first uplink data or first acknowledgement information according to a format of periodic indication information comprised in the first uplink data or the first acknowledgement information; if the decoding is successful, step 13 is performed; if the decoding is unsuccessful, step 14 is performed.

The periodic indication information may be periodic indication information related to the SFN, and the periodic indication information related to the SFN includes at least one of CQI, SRS, SRI and the like. The channel corresponding to the CQI may be a Physical Uplink Control Channel (PUCCH) or a Physical Uplink Shared Channel (PUSCH).

13: The base station determines that the received first uplink data or first acknowledgement information comprises the periodic indication information, and validates periodic resources corresponding to the periodic indication information comprised in the first uplink data or the first acknowledgement information.

During the implementation process, the periodic resources corresponding to the periodic indication information include resources such as a subframe transmitting the periodic indication information.

14: The base station determines that the received first uplink data or first acknowledgement information does not comprise the periodic indication information, and does not validate periodic resources corresponding to the periodic indication information comprised in the first uplink data or the first acknowledgement information. Optionally, step 15 may be performed after this step.

15: The base station performs a first CRC on the received first uplink data or first acknowledgement information according to the format of the periodic indication information not comprised in the first uplink data or the first acknowledgement information; if the check is correct, step 16 is performed; if the check is erroneous, step 17 is performed.

16: The base station sends a first acknowledgement message to the user equipment, wherein the first acknowledgement message indicates that the base station has received the first uplink data or the first acknowledgement information.

17: The base station discards the received first uplink data or first acknowledgement information.

Figure 2:
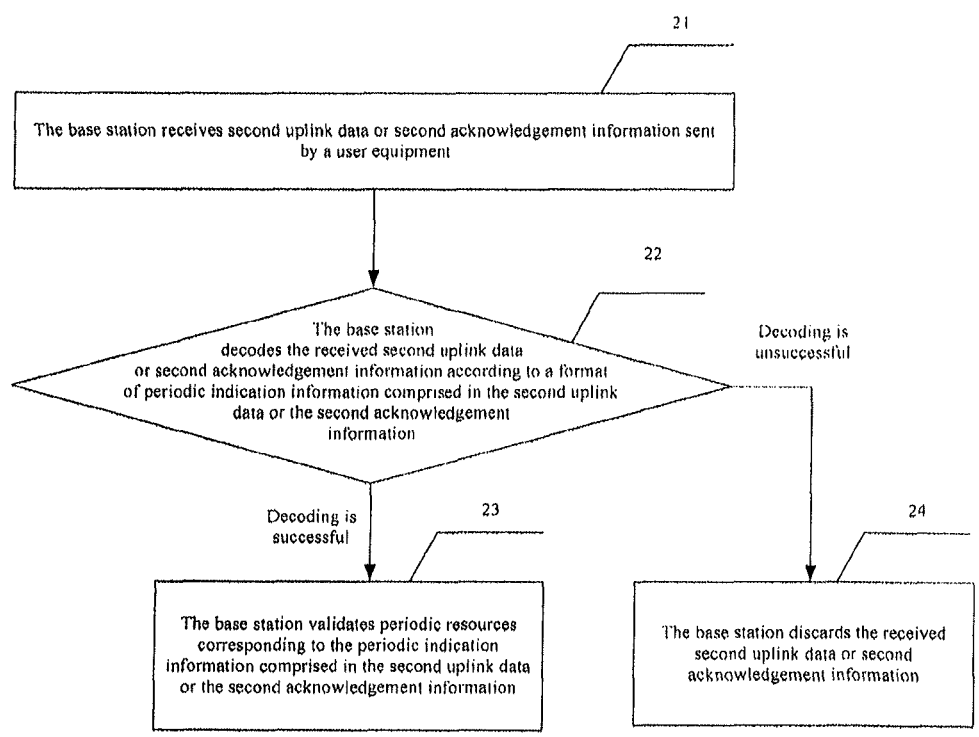
FIG. 2 is a flow diagram of another method for managing resources according to an embodiment of the present invention.

As an optional embodiment, after step 13 is performed, i.e., the base station has validated the periodic resources corresponding to the periodic indication information comprised in the first uplink data or the first acknowledgement information, when second uplink data or second acknowledgement information sent by the user equipment is received by the base station, as illustrated in FIG. 2, the following contents may be further included in this method.

21: The base station receives second uplink data or second acknowledgement information sent by the user equipment.

22: The base station decodes the received second uplink data or second acknowledgement information according to a format of periodic indication information comprised in the second uplink data or the second acknowledgement information; if the decoding is successful, step 23 is performed; if the decoding is unsuccessful, step 24 is performed.

23: The base station validates periodic resources corresponding to the periodic indication information comprised in the second uplink data or the second acknowledgement information.

24: The base station discards the received second uplink data or second acknowledgement information.

Figure 3:
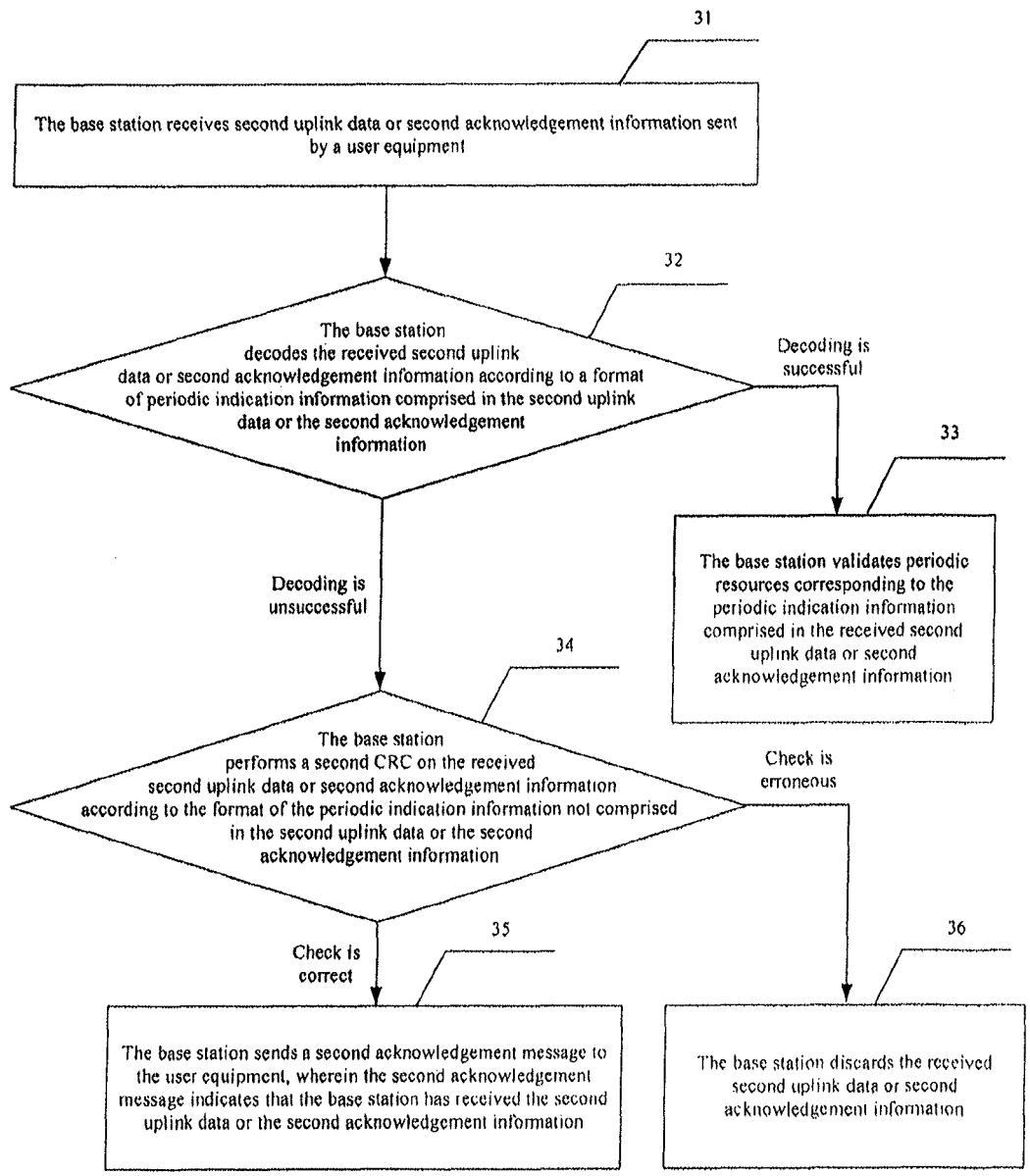
FIG. 3 is a flow diagram of still another method for managing resources according to an embodiment of the present invention.

As another optional embodiment, after step 14 is performed, i.e., the base station does not validate the periodic resources corresponding to the periodic indication information comprised in the first uplink data or the first acknowledgement information, when second uplink data or second acknowledgement information sent by the user equipment is received by the base station, as illustrated in FIG. 3, the following contents may be further included in this method.

31: The base station receives second uplink data or second acknowledgement information sent by the user equipment.

32: The base station decodes the received second uplink data or second acknowledgement information according to a format of periodic indication information comprised in the second uplink data or the second acknowledgement information; if the decoding is successful, step 33 is performed; if the decoding is unsuccessful, step 34 is performed.

33: The base station validates periodic resources corresponding to the periodic indication information comprised in the received second uplink data or second acknowledgement information.

34: The base station performs a second CRC on the received second uplink data or second acknowledgement information according to the format of the periodic indication information not comprised in the second uplink data or the second acknowledgement information; if the check is correct, step 35 is performed; if the check is erroneous, step 36 is performed.

35: The base station sends a second acknowledgement message to the user equipment, wherein the second acknowledgement message indicates that the base station has received the second uplink data or the second acknowledgement information.

36: The base station discards the received second uplink data or second acknowledgement information.

In the above methods, the process of decoding according to the format of the periodic indication information comprised in the uplink data or the acknowledgement information is substantively performing a CRC according to the above format, for the purpose of enabling the base station to acquire whether the uplink data or the acknowledgement information sent by the user equipment comprises the periodic indication information, so as to timely acquire whether the user equipment validates resources corresponding to the periodic indication information. If a decoding is performed according to the format of the periodic indication information comprised in the uplink data or the acknowledgement information and the decoding is successful, it means that the user equipment validates the periodic resources, which overcomes the problem in the prior art that data is erroneously retransmitted due to the base station and the user equipment asynchronously validating the periodic resources corresponding to the periodic indication information, thereby reducing the interruption time delay.

Specifically, the error detection process using the CRC may be: generating an r-bit CRC code for checking in a certain rule at the user equipment side according to the K-bit binary code sequence to be transmitted, attaching it after the original information to form a new binary code sequence of totally K+r bits, and then sending the new binary code sequence to the base station; the base station performs a check according to a rule obeyed between the information code and the CRC code, wherein the lengths of information field and check field of the CRC code may be randomly selected, wherein K and r are positive integers.

Figure 4:
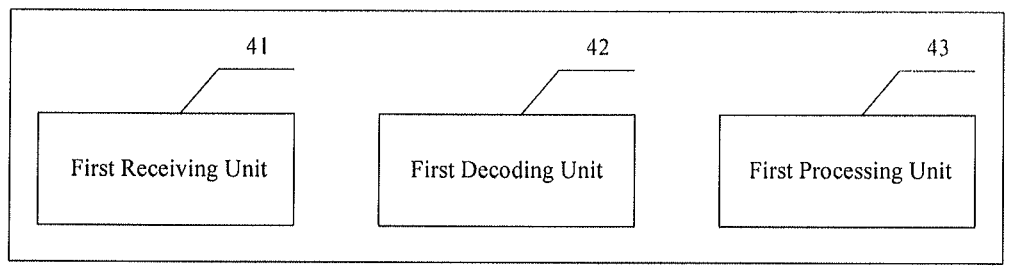
FIG. 4 (1) is a structural schematic diagram of a base station according to an embodiment of the present invention.

The embodiment of the present invention provides a base station, and as illustrated in FIG. 4 (1), the base station includes a first receiving unit 41, a first decoding unit 42 and a first processing unit 43. In which, the first receiving unit 41 receives first uplink data or first acknowledgement information sent by a user equipment. During the implementation process, the acknowledgement information may be an acknowledgement character ACK (acknowledge). The first decoding unit 42 decodes the first uplink data or the first acknowledgement information according to a format of periodic indication information comprised in the first uplink data or the first acknowledgement information. When the first decoding unit 42 successfully decodes the first uplink data or the first acknowledgement information, the first processing unit 43 determines that the first uplink data or the first acknowledgement information received by the first receiving unit 41 comprises the periodic indication information, and validates periodic resources corresponding to the periodic indication information comprised in the first uplink data or the first acknowledgement information; and when the first decoding unit 42 unsuccessfully decodes the first uplink data or the first acknowledgement information, the first processing unit 43 determines that the first uplink data or the first acknowledgement information received by the first receiving unit 41 does not comprise the periodic indication information, and does not validate periodic resources corresponding to the periodic indication information comprised in the first uplink data or the first acknowledgement information.

The periodic indication information may be periodic indication information related to the SFN, and the periodic indication information related to the SFN includes at least one of CQI, SRS, SRI and the like.

Optionally, as illustrated in FIG. 4 (2), the base station may further include: a first checking unit 44 configured to perform a first CRC on the first uplink data or the first acknowledgement information according to the format of the periodic indication information not comprised in the first uplink data or the first acknowledgement information, when the first decoding unit 42 unsuccessfully decodes the first uplink data or the first acknowledgement information received by the first receiving unit 41.

Optionally, the base station may further include a second processing unit 45 configured to send a first acknowledgement message to the user equipment when the first checking unit 44 checks the first CRC is correct, wherein the first acknowledgement message indicates that the base station has received the first uplink data or the first acknowledgement information; and discard the first uplink data or the first acknowledgement information received by the first receiving unit 41 when the first checking unit 44 checks the CRC is erroneous.

Before performing the first receiving unit 41, the base station may further include a connection establishing unit 40 configured to return an access response after receiving an access request sent by the user equipment, so as to establish a connection with the user equipment.

Optionally, as illustrated in FIG. 5, the base station may further include: a second receiving unit 51, a second decoding unit 52 and a third processing unit 53. In which, the second receiving unit 51 receives second uplink data or second acknowledgement information sent by the user equipment. The second decoding unit 52 decodes the second uplink data or the second acknowledgement information received by the second receiving unit 51 according to a format of periodic indication information comprised in the second uplink data or the second acknowledgement information. When the second decoding unit 52 successfully decodes the second uplink data or the second acknowledgement information, the third processing unit 53 determines that the second uplink data or the second acknowledgement information received by the second receiving unit 51 comprises the periodic indication information, and validates periodic resources corresponding to the periodic indication information comprised in the second uplink data or the second acknowledgement information; and when the second decoding unit 52 decodes unsuccessfully, the third processing unit 53 processes the second uplink data or the second acknowledgement information. During the implementation process, the third processing unit 53 may further include:

a discarding subunit 531 configured to discard the second uplink data or the second acknowledgement information received by the second receiving unit 51, when the first processing unit 43 has validated the periodic resources corresponding to the periodic indication information comprised in the first uplink data or the first acknowledgement information; and/or a checking subunit 532 configured to perform a second CRC on the second uplink data or the second acknowledgement information received by the second receiving unit 51 according to the format of the periodic indication information not comprised in the second uplink data or the second acknowledgement information, when the first processing unit 43 does not validate the periodic resources corresponding to the periodic indication information comprised in the first uplink data or the first acknowledgement information.

Optionally, the base station may further include a processing subunit 533 configured to send a second acknowledgement message to the user equipment when the checking subunit 532 checks the second CRC is correct, wherein the second acknowledgement message indicates that the base station has received the second uplink data or the second acknowledgement information; and discard the second uplink data or the second acknowledgement information received by the second receiving unit 51 when the checking subunit 532 checks the second CRC is erroneous.

The specific implementation manners of the processing functions of respective units included in the base station have been described in the above method embodiments, and herein are not repeated.

In the embodiment of the present invention, the base station will not validate the periodic resources corresponding to the periodic indication information immediately after establishing a connection with the user equipment, and instead, the base station validates the periodic resources corresponding to the periodic indication information after successfully decoding the uplink data or the acknowledgement information according to the format of the periodic indication information comprised in the uplink data or the acknowledgement information, and determining that the user equipment has validated the periodic resources. When the uplink data or the acknowledgement information is successfully decoded according to the format of the periodic indication information comprised in the uplink data or the acknowledgement information, it means that the user equipment validates the periodic resources, thus in that case, the base station validates the periodic resources, which avoids the data retransmission caused by the CRC error, thereby reducing the interruption time delay. Further, when unsuccessfully decoding the uplink data or the acknowledgement information according to the format of the periodic indication information comprised in the uplink data or the acknowledgement information, the base station performs a CRC on the uplink data or the acknowledgement information according to the format of the periodic indication information not comprised in the uplink data or the acknowledgement information, so that the base station validates the periodic resources corresponding to the periodic indication information at appropriate time, thereby achieving the purpose of reducing the switching interruption time delay.

To be noted, in the above embodiment of the base station, the included respective units are just classified according to the functional logics, but they are not limited thereto so long as corresponding functions can be implemented. In addition, the specific names of the respective units are also only used to distinguish the units from each other, rather than limiting the protection scope of the present invention.

In addition, a person skilled in the art can appreciate that all or parts of steps in the above respective method embodiments may be implemented by instructing relevant hardware through a program, and the corresponding program may be stored in a computer readable storage medium. The storage medium mentioned above may be Read-Only Memory (ROM), magnetic disk, optical disk, etc.

The above descriptions are just preferred embodiments of the present invention, and the protection scope of the present invention is not limited thereto. Any change or substitution easily conceivable to a person skilled in the art within the technical scope disclosed by the embodiments of the present invention should fall within the protection scope of the present invention. Therefore, the protection scope of the present invention shall be determined by the protection scope of the claims.

What is claimed is:

1. A method for managing resources, comprising:
receiving, by a base station, first uplink data or first acknowledgement information sent by a user equipment after establishing a connection with the user equipment;
decoding, by the base station, the first uplink data or the first acknowledgement information according to a format of periodic indication information comprised in the first uplink data or the first acknowledgement information used to determine whether the user equipment validates periodic resources corresponding to the periodic indication information; and
after the base station decoded the uplink data or the acknowledgement information, determining, by the base station, that user equipment has validated the periodic resources, and validating, by the base station, the periodic resources corresponding to the periodic indication information comprised in the first uplink data or the first acknowledgement.

2. The method according to claim 1, further comprising:
when the first uplink data or the first acknowledgement information is unsuccessfully decoded, determining, by the base station, that the first uplink data or the first acknowledgement information does not comprise the periodic indication information, and not validating, by the base station, the periodic resources corresponding to the periodic indication information comprised in the first uplink data or the first acknowledgement information; and
performing, by the base station, a first Cyclic Redundancy Check (CRC) on the first uplink data or the first acknowledgement information according to the format of the periodic indication information not comprised in the first uplink data or the first acknowledgement information.

3. The method according to claim 2, further comprising:
when the first CRC is correct, sending, by the base station, a first acknowledgement message to the user equipment, wherein the first acknowledgement message indicates that the base station has received the first uplink data or the first acknowledgement information; and
when the first CRC is erroneous, discarding, by the base station, the first uplink data or the first acknowledgement information.

4. The method according to claim 2, further comprising:
receiving, by the base station, second uplink data or second acknowledgement information sent by the user equipment;
decoding, by the base station, the second uplink data or the second acknowledgement information according to the format of the periodic indication information comprised in the second uplink data or the second acknowledgement information; and
when the second uplink data or the second acknowledgement information is unsuccessfully decoded, discarding, by the base station, the second uplink data or the second acknowledgement information if the base station has validated the periodic resources corresponding to the periodic indication information comprised in the first uplink data or the first acknowledgement information; or
performing, by the base station, a second CRC on the second uplink data or the second acknowledgement information according to the format of the periodic indication information not comprised in the second uplink data or the second acknowledgement information if the base station does not validate the periodic resources corresponding to the periodic indication information comprised in the first uplink data or the first acknowledgement information.

5. The method according to claim 4, further comprising:
when the second CRC is correct, sending, by the base station, a second acknowledgement message to the user equipment, wherein the second acknowledgement message indicates that the base station has received the second uplink data or the second acknowledgement information; and
when the second CRC is erroneous, discarding, by the base station, the second uplink data or the second acknowledgement information.

6. The method according to claim 1, wherein the periodic indication information comprises periodic indication information related to a system frame number.

7. The method according to claim 6, wherein the periodic indication information related to the system frame number comprises at least one of Channel Quality Indication (CQI), Sounding Reference Signal (SRS) and Scheduling Request Indication (SRI).

8. A base station, comprising:
a receiver, configured to receive first uplink data or first acknowledgement information sent by a user equipment after establishing a connection with the user equipment;

a processor, configured to:
decode the first uplink data or the first acknowledgement information according to a format of periodic indication information comprised in the first uplink data or the first acknowledgement information used to determine whether the user equipment validates periodic resources corresponding to the periodic indication information;
after the base station decoded the uplink data or the acknowledgement information, determine that user equipment has validated the periodic resources, and validate the periodic resources corresponding to the periodic indication information comprised in the first uplink data or the first acknowledgement.

9. The base station according to claim 8, wherein,
the processor is further configured to determine that the first uplink data or the first acknowledgement information does not comprise the periodic indication information when the processor unsuccessfully decodes the first uplink data or the first acknowledgement information, and not to validate periodic resources corresponding to the periodic indication information comprised in the first uplink data or the first acknowledgement information received by the receiver; and,
the processor is further configured to perform a first Cyclic Redundancy Check (CRC) on the first uplink data or the first acknowledgement information according to the format of the periodic indication information not comprised in the first uplink data or the first acknowledgement information, when the processor unsuccessfully decodes the first uplink data or the first acknowledgement information.

10. The base station according to claim 9, wherein,
the processor is further configured to send a first acknowledgement message to the user equipment when the processor checks the first CRC is correct, wherein the first acknowledgement message indicates that the base station has received the first uplink data or the first acknowledgement information; and to discard the first uplink data or the first acknowledgement information when the processor checks the CRC is erroneous.

11. The base station according to claim 9, wherein,
the receiver is further configured to receive second uplink data or second acknowledgement information sent by the user equipment;
the processor is further configured to decode the second uplink data or the second acknowledgement information according to a format of periodic indication information comprised in the second uplink data or the second acknowledgement information; and
the processor is further configured to process the second uplink data or the second acknowledgement information when the processor decodes unsuccessfully; and,
the processor is further configured to discard the second uplink data or the second acknowledgement information when the processor has validated the periodic resources corresponding to the periodic indication information comprised in the first uplink data or the first acknowledgement information; and/or
the processor is further configured to perform a second CRC on the second uplink data or the second acknowledgement information according to the format of the periodic indication information not comprised in the second uplink data or the second acknowledgement information, when the processor does not validate the periodic resources corresponding to the periodic indication information comprised in the first uplink data or the first acknowledgement information.

12. The base station according to claim 11, wherein
the processor is further configured to send a second acknowledgement message to the user equipment when the checking subunit checks the second CRC is correct, wherein the second acknowledgement message indicates that the base station has received the second uplink data or the second acknowledgement information; and
discard the second uplink data or the second acknowledgement information when the checking subunit checks the second CRC is erroneous.

13. The base station according to claim 8, wherein the periodic indication information comprises periodic indication information related to a system frame number.

14. The base station according to claim 13, wherein the periodic indication information related to the system frame number comprises at least one of Channel Quality Indication (CQI), Sounding Reference Signal (SRS) and Scheduling Request Indication (SRI).

* * * * *